Figure 4:
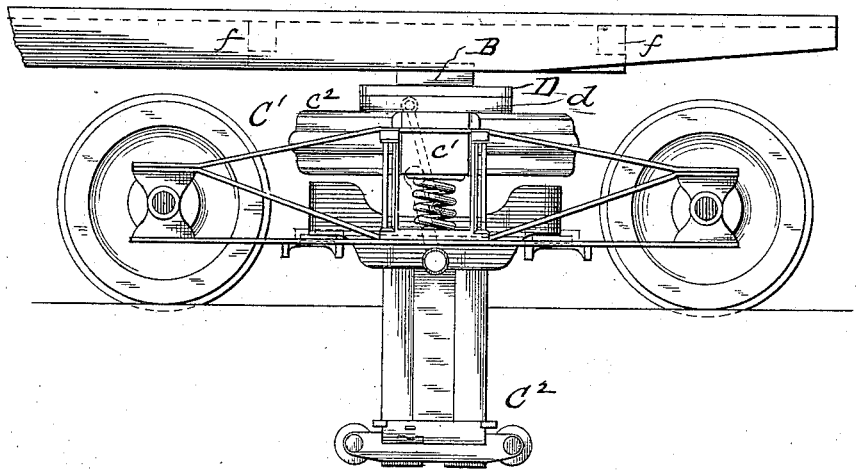

(No Model.) 3 Sheets—Sheet 1.
G. M. BRILL.
CAR FRAME AND TRUCK.
No. 365,669. Patented June 28, 1887.
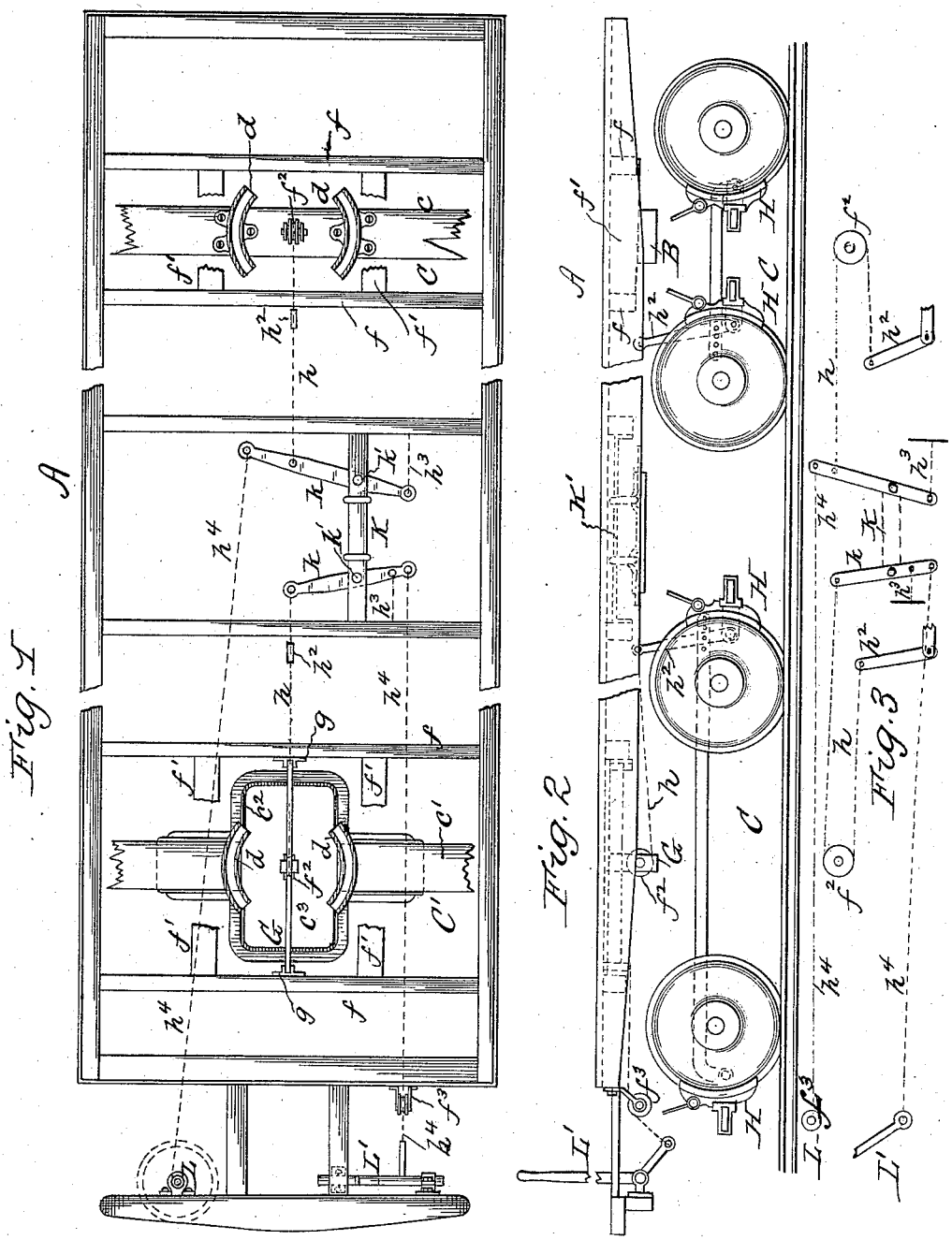
WITNESSES:
INVENTOR
Geo. M. Brill
By S. J. Van Stavoren
ATTORNEY (No Model.) 3 Sheets—Sheet 2.

G. M. BRILL.
CAR FRAME AND TRUCK.

No. 365,669. Patented June 28, 1887.

WITNESSES:
Wm H van Horn
Geo R Byington

INVENTOR
Geo. M. Brill
By S. J. Van Stavoren
ATTORNEY (No Model.)  3 Sheets—Sheet 3.

G. M. BRILL.
CAR FRAME AND TRUCK.

No. 365,669. Patented June 28, 1887.

WITNESSES:

INVENTOR,
Geo. M. Brill
By S. J. Van Stavoren
ATTORNEY

UNITED STATES PATENT OFFICE.

GEORGE M. BRILL, OF PHILADELPHIA, PENNSYLVANIA.

CAR FRAME AND TRUCK.

SPECIFICATION forming part of Letters Patent No. 365,669, dated June 28, 1887.

Application filed November 11, 1886. Serial No. 218,511. (No model.)

*To all whom it may concern:*

Be it known that I, GEORGE M. BRILL, a citizen of the United States, residing at Philadelphia, in the county of Philadelphia and State of Pennsylvania, have invented certain new and useful Improvements in Cars and Car-Trucks, of which the following is a specification, reference being had therein to the accompanying drawings.

My invention has relation to the form of car-trucks shown and described in United States Letters Patent dated March 30, 1886, No. 339,040, or that form which is especially adapted for cable-railway cars, wherein the truck is provided with a central open space, in which is suspended the cable-grip, so that it is located in line with but below the center of the pivotal connection for the truck and car-body. With this form of truck I have found that the usual arrangement of operating-levers and chain-connections for the brake-shoes of the car, or that having a pull to one side of the longitudinal center line of the car for operating the brakes, is defective in that too much slack is required in the chains or their connections to admit of the cars or trucks reversing to the right and to the left in traveling around or over the curves of the line. This undue slack in the chain-connections necessitates undue movement of the brake-operating lever or rod in applying the brakes, and consequently they cannot be applied as quickly as is desirable. To avoid these objections or to take up the slack in the chain-connections for the brake mechanism, so as to make it quick-acting in its operation, is the object of my invention. To accomplish this result it is essential to have the pull of the chain-connections for the brake mechanism in line with the longitudinal center of the car, to admit of the car or the trucks reversing to the right or to the left in traveling over the curved parts of the line; and to secure this effect I place or journal idler-pulleys for the brake-chains in line with the vertical center of the pivotal connections of the car-truck and car-body. To admit of so locating the idler-pulleys the car-bolster, to which the truck-bolster is pivoted, is provided with a central open space, or, in other words, it is severed at its transverse center, or that corresponding to the longitudinal center of the car body or truck, and in this open space is located the idler-pulley, and it corresponds to the open space in the truck-bolster when the latter is provided with such space for the suspension of the grip.

My invention, accordingly, consists of the combination, construction, and arrangement of parts, as hereinafter described and claimed, having reference particularly to a car-body having divided or severed bolsters to form central open spaces therein, and to which bolsters the truck-bolsters are pivoted; to idler-pulleys located in the open spaces of the car-bolsters for the chain-connections for the brake-shoe-operating mechanism; to a divided or severed truck-bolster having a central open space, and a car-bolster to which the truck-bolster is pivoted, which car-bolster has an open space corresponding to that of the truck-bolster; to a cable-grip or engaging mechanism suspended in the central space in the truck-bolster, and an idler-pulley located in the central space of the car-bolster for the chain-connections for the brake-shoe mechanism.

Figure 5:
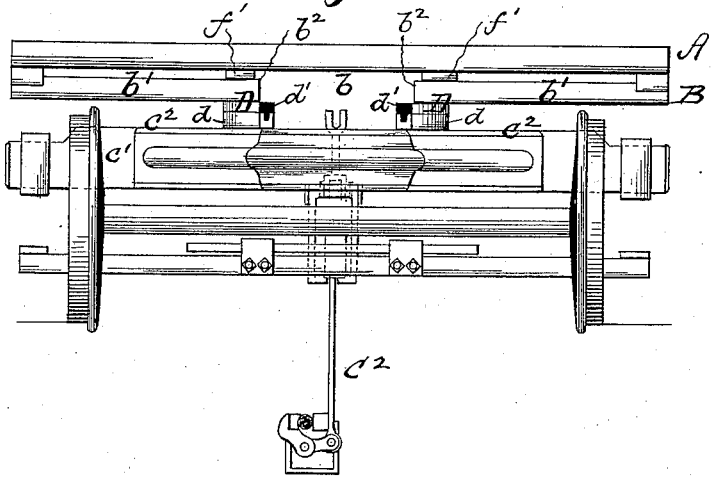

In the drawings, Figure 1 is a plan of the sills of a car-body and part of the truck-bolsters and brake-operating mechanism embodying my invention, the car-bolsters to which the truck-bolsters are pivoted being broken away or not shown. Fig. 2 is an elevation of car-sills, running-gear, and brake mechanism, the car-truck frames and bolster not being shown. Fig. 3 is a diagram showing chain-connections for brake mechanism. Fig. 4 is an elevation of the truck, from which the cable grip is suspended, and of adjacent end of car. Fig. 5 is an end view of same; and Fig. 6 is a plan of car frame or sills and divided bolster, to which the truck is pivoted, and showing part of a truck-bolster.

A represents the sills or bottom frame of a car body; B, its bolsters, to which the car-trucks C C' are pivoted. The trucks C C' are represented constructed as shown and described in above-named patent—that is to say, the bolster $c$ of the rear truck is in one piece, having segmental guides $d$, and the bolster $c'$ of truck C' is in two pieces or sections united by an open frame or ring, $c^2$, to provide a central open space, $c^3$, in which the grip $C^2$ is suspended, and which is also furnished with segmental guides $d$. Into these guides enter the curved parts $d'$ of pivot-shoes D, secured to the car-bolsters B, and by means of which the trucks are pivoted to the car, so as to turn when traveling on or over the curves of the line. The grip $C^2$ is secured to truck $C'$ in space $c^3$, as shown in Figs. 4 and 5, or as fully set forth in said patent; but as it and the detailed construction of the truck or trucks may be provided for as desired, they need not further be described.

Figure 6:
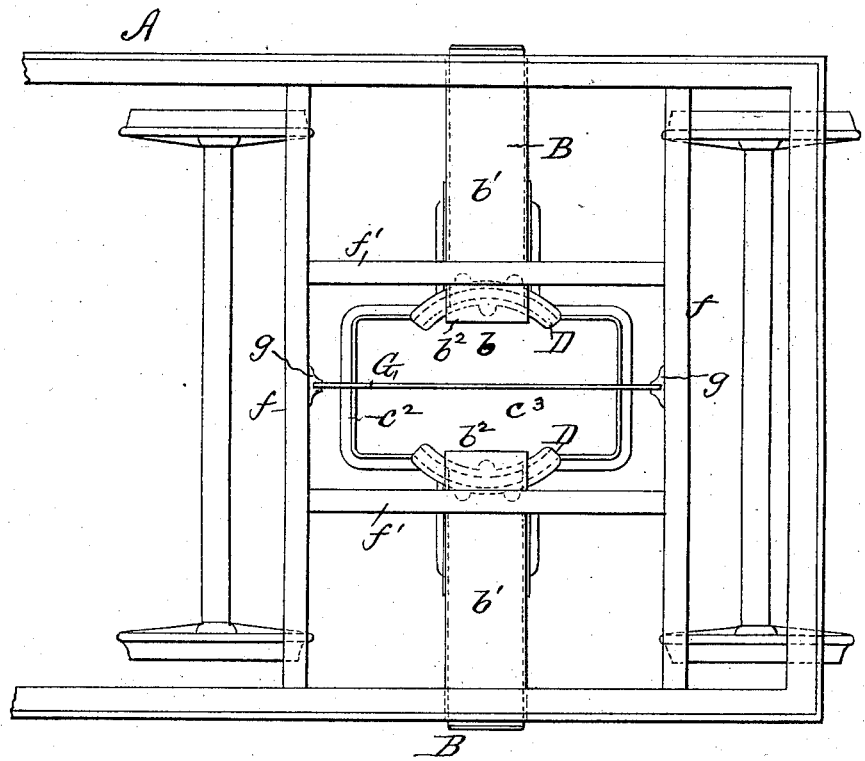

The car-bolsters B are severed or divided at their transverse center, or a portion of the same is cut away to provide in each an open space, $b$, and to firmly secure the sections $b'$ $b'$ of the bolster to the car-sills or bottom frame the sides of the latter are preferably connected by parallel cross-beams $f$ $f$, adjacent to the bolsters B, to which are suitably framed or secured inside sills or bars, $f'$ $f'$, and these are bolted or otherwise suitably attached to the inner ends, $b^2$, of the bolster-sections $b'$ $b'$, with their pivot-shoes D, which are suitably bolted or secured to said ends, as more plainly seen in Figs. 5 and 6. In spaces $b$ of one or both bolsters B, and in line with the longitudinal center of the car, is a metal or other bar, G, loosely or otherwise supported in brackets $g$, fastened to cross-beams $f$ $f$. In bars G, in line with the vertical center of the open spaces $b$ of bolsters B, are journaled idler-pulleys $f^2$, over which pass the chains $h$ for the brake-shoes H for the wheels of each truck.

One end of each chain is connected to the truck brake-shoe lever $h^2$, (see more plainly Figs. 2 and 3,) and the other to a lever, $k$, pivoted at $k'$ to a bar, K, suitably attached to frame A; or said levers may be pivoted directly to said frame, and they have chains $h^3$ for limiting the extent of their motion. The levers $k$ are connected by chains $h^4$ to a brake-rod, L, or to a brake-lever, L', attached to the car-frame at one or both of its ends. By this described arrangement of chain-connections for the brake-shoes separate chain-connections, each having separate operating brake handles or levers, is provided for each truck C C', and one is used as a reserve for the other in case of accident to any one of them; or both may be operated simultaneously by attendants on the car, if desired.

When the brake lever or rod L' or L on the car is applied, the chains $h^4$ are drawn up to oscillate levers $k$, which in turn pull on chains $h$ to move truck brake-levers $h^2$ to apply the brake-shoes H, and as the chains $h$ and idlers $f^2$ are in the longitudinal center of the car the pull on the chains is correspondingly central, and as the idlers $f^2$ are in the line of the vertical center of the pivotal connections for the trucks this pull is effected without necessitating any slack in chains $h$ to admit of the trucks turning to the right or left in traveling over curves, and as there is no slack in the chain-connections the brakes are quickly applied without necessitating any undue movement or rotation of the car-brake rod or lever.

Suitable idlers, $f^3$, if desired, may be located in the path of the chains $h^4$, as shown in Fig. 1, and any suitable form of car-brake rod or lever may be used.

The brake-shoes may be applied to the outer or inner sides of the wheels, as shown in Fig. 2, or they may be hung upon the truck or car-frames, as deemed expedient.

In applying my invention to a train of cars the chains are also coupled together in any suitable manner to obtain a simultaneous application of all the brake-shoes of the cars of a train.

While I have shown a construction of severed bolster and its open space, it is obvious that such bolster may be severed and its parts joined together, or otherwise constructed in various ways to provide the open space $b$; hence I do not confine myself to any one way of making the bolster or connecting its parts to form the central open space, $b$, therein.

The bar K for levers may, if desired, be loosely hung upon a bar, K', secured to the car-frame, so that the bar K, with the levers $k$ $k$, can slide longitudinally more or less, and more readily adjust themselves to the tension strains of the chain-connections and to the movements of the trucks in going around curves.

It will be noted from the foregoing that the bolsters B, having the open spaces $b$, admit of locating the idlers $f^2$ in the longitudinal center of the car and in the line of the vertical centers of the pivotal connections between the car and the trucks; hence no matter how much the latter turn in traveling on the curves the chain-connections for the brakes are not affected. Therefore no slack in the chain-connections is required, and as they are always taut a movement of the brake levers or rod on the car begins at once to apply the brakes, however small such movement may be.

While I have shown my improvements especially applicable to cable cars, I do not limit myself thereto, as they are equally applicable to cars of all construction or kind. So, too, where the truck-bolster is in one piece, or in other cases, as desired, the idler $f^2$ may be journaled upon the bolster, as shown to the right of Fig. 1, in which case the bar G and its supporting-brackets are dispensed with.

What I claim is—

1. The combination of a car-body having one or more bolsters provided with central open spaces and car-trucks pivoted to said bolsters, substantially as set forth.

2. A car-body having sectional bolsters with central open spaces, car-trucks pivoted to said bolsters, and chain-connections in line with the center of said spaces, and brake-operating mechanism connected to said chains, substantially as set forth.

3. A car-body having a bolster with a central open space, an idler-pulley in said space, a truck pivoted to said bolster, and brake-shoe mechanism having a chain-connection with said pulley, substantially as set forth.

4. A car having pivoted trucks, brake-shoe mechanism, and chain-connections arranged to admit of the trucks turning on a curve without tightening or moving said chain-connections, which operate to pull on the brake-shoes in the longitudinal central line of the car, substantially as set forth.

5. A car-frame having divided bolster B, cross-beams $f$, and cross-sills $f'$, connected to said beams and supporting the adjacent or inner ends of the bolster sections, substantially as set forth.

6. A car-frame having a bolster composed of sections with central open space between the sections, the inner or adjacent ends of the sections having pivot-shoes, cross-sills $f'$, cross-beams $f$, and a truck having connection with said shoes, substantially as set forth.

7. A car-frame having a bolster with central open space, a bar loosely supported in said space, and having an idler, $f^2$, substantially as set forth.

8. The combination, with a car-body, of the bolsters B B, having open spaces $b$, idlers $f^2$, chains $h\ h$, levers $k$, sliding frame or bar K, chains $h^4\ h^4$, trucks having pivotal connections with said bolsters, and brake-shoes having connection with said chains and brake-shoe mechanism, substantially as set forth.

9. The combination of a car-body having a bolster provided with a central open space, a truck provided with a bolster having corresponding central opening, brake-shoes for the wheels of the truck and actuating mechanism, and a cable gripping or engaging device suspended within the central opening of the truck-bolster, substantially as set forth.

10. The combination of a car-body having a bolster with central open space, brakes and operating devices, pivoted four-wheeled truck provided with a bolster having an opening within the pivot thereof, and a gripping device for a cable railway located under the pivot-center and extending up within the opening in the bolster, substantially as and for the purpose specified.

11. In combination with a car-body having a divided bolster, a truck having a divided bolster, the two end sections thereof being united by an annular or ring-shaped casting, which also acts as the pivot for the car-body, substantially as set forth.

12. In combination with a car-body having a divided bolster, and a truck having a divided bolster, the two end sections thereof being united by an annular or ring-shaped casting, which also acts as the pivot for the car-body, a gripping device for cable railways supported within said annular casting and between the two sections of the bolster, substantially as set forth.

13. The combination of a car-body having a bolster having its center cut away to form an open space, a truck having a bolster having its center cut away and its ends united by an annular casting or forging, and pivotal connections between said bolsters, substantially as set forth.

14. The combination of a car-body, having a divided bolster provided with pivot-shoes D, and a truck having a bolster having its center cut away and its ends united by an annular casting or forging provided with pivot-bearings adapted to shoes D, substantially as set forth.

15. The combination of a car, having a divided bolster provided with segmental pivot-shoes, and a truck having a bolster provided with segmental guides for said pivot-shoes, whereby the truck is pivoted to the car-bolster intermediate of its transverse center and its ends, substantially as set forth.

In testimony whereof I affix my signature in presence of two witnesses.

GEO. M. BRILL.

Witnesses:
H. RANDALL,
S. J. VAN STAVOREN.